April 22, 1941.  G. DE CROCE ET AL  2,239,552
REMOTE METERING SYSTEM
Filed July 25, 1939
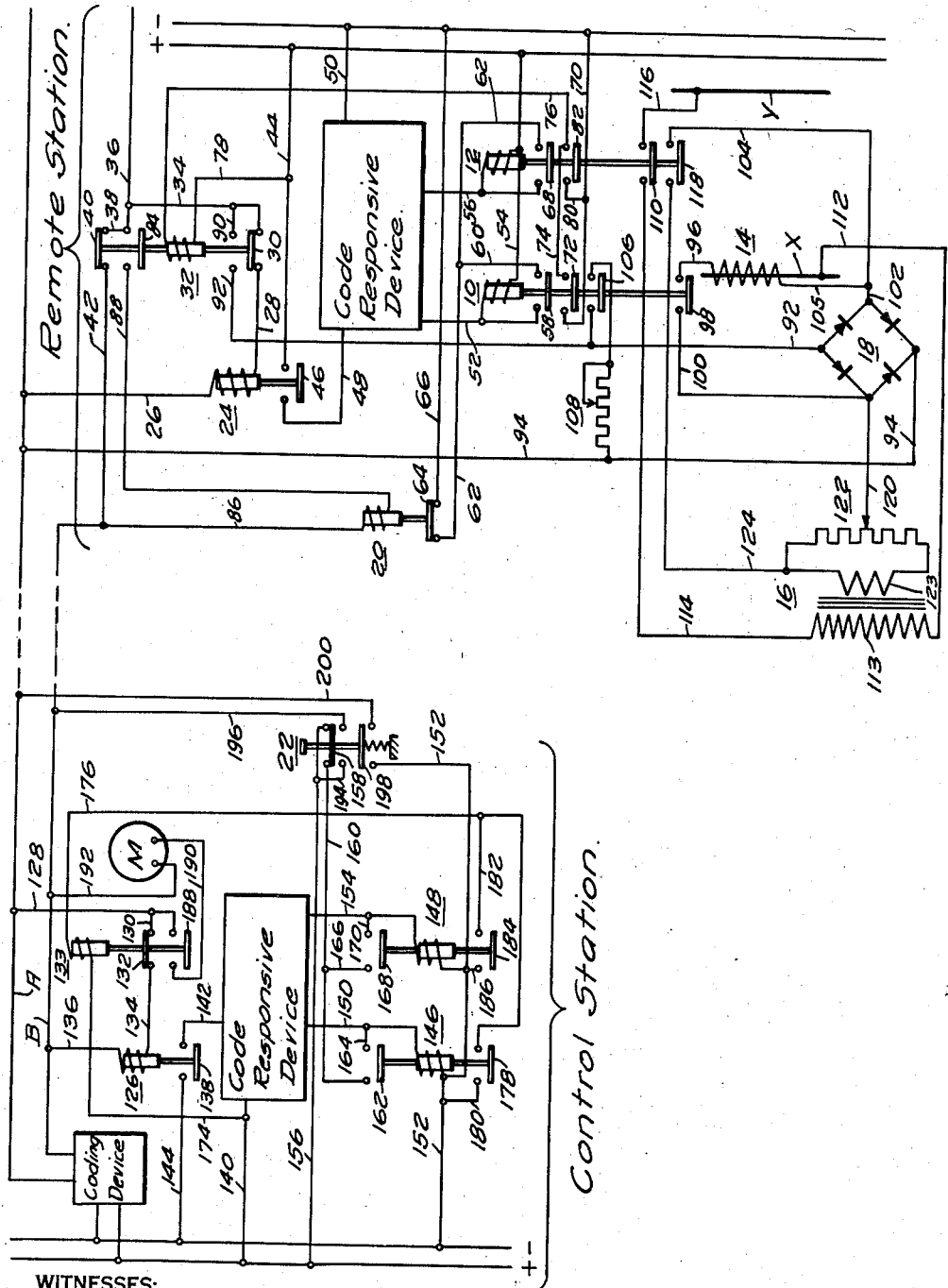
WITNESSES:
E. A. McCloskey
Joe Weber
INVENTORS
Gennero De Croce
and Willard A. Derr
BY G. M. Crawford
ATTORNEY Patented Apr. 22, 1941

2,239,552

UNITED STATES PATENT OFFICE 2,239,552

REMOTE METERING SYSTEM

Gennero De Croce and Willard A. Derr, Wilkinsburg, Pa., assignors to Westinghouse Electric & Manufacturing Company, East Pittsburgh, Pa., a corporation of Pennsylvania Application July 25, 1939, Serial No. 286,348

7 Claims. (Cl. 177—351)

Our invention relates, generally, to remote metering systems, and particularly, to systems of remote metering used in conjunction with supervisory control systems.

Systems of remote metering in common use for transmitting indications of alternating-current potential and current values at a remote station over the supervisory control system conductors to a control station, commonly use a rectifier at the remote station and a line relay for releasing the selected metering circuits. Such systems require a base current to properly control the line relay, the base current being supplied by the station battery.

In the operation of such systems, whenever it is desired to take a reading, it is necessary to calibrate the system by adjusting the base current to thereby obviate any errors due to variations of the battery potential, and a very considerable number of time-consuming operations are necessary to accomplish this calibration and to obtain the indication at the control station. A further disadvantage of these systems employing a base current and a rectifier for transmitting alternating potential and current indications, is that the rectifiers commonly used have an effective resistance which varies with the current passing through the rectifier, thus varying the effective base current potential and requiring hand-marking of the meters for each installation as the characteristics of the system are determined from tests after the system is set up.

An object of our invention is to provide a remote metering system for use in conjunction with supervisory control systems which shall obviate the use of base current and hence the disadvantages of systems using base currents, which shall be simple and efficient in operation, and which shall be inexpensive to manufacture, install, operate and maintain.

The objects and advantages of the invention will be apparent from the following detailed description taken in connection with the accompanying drawing, in which the single figure is a diagrammatic representation of a remote metering system embodying the principal features of our invention.

In practicing our invention, we provide a coding device located at the control station, as indicated, and operable to transmit coded impulses over the line conductors A and B to the remote station from which indications of current and potential are to be transmitted to the control station. A code responsive device at the remote station selectively actuates relays 10 and 12 which function to connect the current transformer 14 and the potential transformer 16 respectively, to the line conductors A and B through a rectifier 18. A code responsive device at the control station responds to the selective code impulses transmitted over the line conductors A and B by the coding device to connect the meter M to respond to the potential applied to the line conductors A and B through the rectifier 18.

A line relay 20 at the remote station is connected to be energized by the line current when the rectifier 18 is connected to the line conductors A and B and is adjusted to respond only to a line current of a value higher than that of the metering current transmitted to the control station from the remote station. When it is desired to disconnect the rectifier 18 and its associated selected transformer 14 or 16 from transmitting relation with the line A and B, a controller 22 is actuated to apply sufficient potential to the line to operate the line relay 20 which will function to disconnect the transmitting apparatus. The actuation of the controller 22 will also disconnect the meter M from the line.

Considering the system more in detail, the coding and code responsive devices may be any devices common to the art for transmitting and receiving coded selective impulses over the conductors A and B to and from the remote station. At the remote station a relay 24 is connected to be energized by the impulses transmitted by the coding device at the control station in a circuit which extends from the conductor A through the conductor 26, the winding of the relay 24, conductor 28, contact element 30 of a relay 32, conductors 34, 36 and 38, contact element 40 of the relay 32, and conductor 42 to the conductor B. Upon the energization of the relay 24 with each coding impulse, the relay 24 will energize the code responsive device through a circuit which extends from one side of a suitable source of direct-current power through a conductor 44, contact element 46 of the relay 24, conductor 48, the code responsive device, and a conductor 50 to the other side of the source of direct-current power.

The code responsive device at the remote station may be any such device common to the art which is responsive to selective coded impulses to selectively energize associated relays in accordance with the coded impulses applied thereto. The code responsive device is connected to selectively energize the relays 10 and 12 and the circuit for the relay 10 extends from one side of the source of direct-current power through the conductor 50, the code responsive device, conductor 52, the winding of relay 10, and conductor 54 to the other side of the source of direct-current power. A similar energizing circuit for the relay 12 extends from one side of the source of direct-current power through the conductor 50, the code responsive device, conductor 56, the winding of relay 12 and the conductor 54 to the other side of the source of direct-current power. Holding circuits for maintaining the relays 10 and 12 energized after they are actuated by the code responsive device are provided, the circuit for the relay 10 extending from one side of the source of direct-current power through the conductor 54, to the winding of the relay 10, conductor 52, contact element 58 of the relay 10, conductors 60 and 62, contact element 64 of the relay 20, and the conductor 66 to the other side of the source of direct-current power. The holding circuit for the relay 12 extends from one side of the source of direct-current power through the conductor 54, the winding of relay 12, conductor 56, contact element 68 of the relay 12, conductor 62, contact element 64 and conductor 66 to the other side of the source of direct-current power.

The operation of either relay 10 or relay 12 will close an operating circuit for the relay 32, the circuit controlled by the relay 10 extending from one side of the source of direct-current power through the conductor 70, contact element 72 of the relay 10, conductors 74 and 76, the winding of relay 32 and conductors 78 and 44 to the other side of the source of direct-current power. The corresponding circuit controlled by the relay 12 extends from one side of the source of direct-current power through the conductors 70 and 80, contact element 82 of the relay 12, conductor 76, the winding of relay 32, and conductors 78 and 44 to the other side of the source of direct-current power.

The operation of the relay 32 functions to connect the relay 20 in series circuit with the line conductor B by the closure of its contact element 84 and the opening of its contact element 40, the contact element 84 completing a circuit for the relay 20, which extends from the conductor B through the conductor 86, the winding of relay 20, the conductor 88 and the contact element 84 of the relay 32 to the conductor 36. The operation of the relay 32 also functions to connect the rectifier 18 in a circuit to apply potential to the conductors A and B, which extends from the conductor B through the conductor 86, the winding of relay 20, conductor 88, contact element 84, conductors 36, 34 and 90, contact element 30 of the relay 32, conductor 92, the rectifier 18 and conductor 94 to the conductor A.

The actuation of the relay 10 will function to connect the secondary of the current transformer 14 to the rectifier 18 so that a potential, which is a function of the current flowing in the conductor, will be applied to the rectifier and transmitted as a direct-current potential to the line conductors A and B. The circuit for the current transformer 14 extends from one side of the current transformer through the conductor 96, contact element 98 of the relay 10, conductor 100, the rectifier 18 and conductors 102 and 105 to the other side of the winding of the current transformer 14. At the same time, the contact element 106 functions to connect a calibrating rheostat 108 across the output conductors 92 and 94 of the rectifier 18 to properly adjust the output potential of the current transformer to the characteristics of the line conductors and the indicating meter at the control station.

The operation of the relay 12 effects the closure of its contact element 110 to connect the primary windings of the potential transformer 16 between the conductors X and Y the potential between which it is desired to indicate at the control station. This circuit for the primary winding of the potential transformer 16 extends from the conductor X to conductor 112, the primary winding 113 of the potential transformer 16, conductor 114, contact element 110 and the conductor 116 to the conductor Y. At the same time, the secondary winding 123 of the potential transformer 16 is connected to energize the rectifier 18 by the contact element 118 of the relay 12 in a circuit which extends from one side of the rectifier 18 through conductor 120 to a selected point of rheostat 122, which is connected across the secondary winding 123 of the potential transformer 16, and which may be selectively adjusted to properly adjust the output potential of the potential transformer 16 to the characteristics of the line conductors A and B, and the indicating meter at the operating station, the conductor 124, contact element 118 and conductors 104 and 102 to the other side of the rectifier 18.

At the control station, a relay 126 is connected to be energized by the code impulses produced by the coding device through a circuit which extends from the conductors 128 and 130, contact element 132 of a relay 133, conductor 134, the winding of relay 126 and conductor 136 to the conductor B. Actuation of the relay 126 by the code impulses will close its contact element 138 to energize a code responsive device similar to the code-responsive device at the remote station through a circuit which extends from one side of a suitable source of direct-current power through a conductor 140, the code responsive device, conductor 142, contact element 138 and conductor 144 to the other side of the source of direct-current power. The code responsive device at the control station will respond to the code impulses applied to it and selectively energize relays 146 and 148. The energizing circuit for the relay 146 extends from the one side of the source of direct-current power through the conductor 140, the code responsive device, conductor 150, the winding of relay 146 and conductor 152 to the other side of the source of direct-current power. A similar energizing circuit for the relay 148 extends from one side of the source of direct-current power through the code responsive device, the conductor 154, the winding of relay 148 and conductor 152 to the other side of the source of direct-current power. A holding circuit to maintain the relay 146 energized extends from one side of the source of direct-current power through the conductor 156, normally closed contact element 158 of the controller 22, conductor 160, contact element 162 of the relay 146, conductors 164 and 150, the winding of relay 146 and the conductor 152 to the other side of the source of direct-current power. A similar holding circuit is provided for the relay 148, which extends from one side of the source of direct-current power through the conductor 156, contact element 158, conductor 160, conductor 166, contact element 168 of the relay 148, conductors 170 and 154, the windings of relay 148 and conductor 152 to the other side of the source of direct-current power.

The actuation of the relays 146 or 148 will function to close an energizing circuit for the relay 133, the energizing circuit controlled by the relay 146 extending from one side of the source of direct-current power through the conductors 140 and 174, the winding of the relay 133, conductor 176, contact element 178 of the relay 146 and conductors 180 and 152 to the other side of the source of direct-current power. The corresponding energizing circuit for the relay 133 controlled by the relay 148 extends from one side of the source of direct-current power through the conductors 140 and 174, the winding of the relay 133, conductors 176 and 182, contact element 184 of the relay 148 and conductors 186 and 152 to the other side of the source of direct-current power. The actuation of the relay 133 will close its contact element 188 to connect the meter M to the line conductors A and B in a circuit which extends from the conductor A through the conductor 128, contact element 188, conductor 190, the meter M and conductor 192 to the conductor B. The actuation of the relay 133 also opens its contact element 132 to disconnect the relay 126 from the line conductors A and B.

The controller 22 normally biased to the position shown in the drawing, may be manually actuated to connect the source of direct-current power to the conductors A and B through a circuit which extends from one side of the source of direct-current power through the conductors 156 and 194, contact element 158 of the controller 22, and conductor 196 to the conductor B, and from the other side of the source of direct-current power through the conductor 152, contact element 198 of controller 22 and conductor 200 to the line conductor A. The relay 20 at the remote station, which functions to control the holding circuit of the relays 10 and 12 as hereinbefore described, is so adjusted as to be unresponsive to currents of the magnitude of the meter currents transmitted over the line conductors A and B at the operating station from the remote station, but to be responsive to larger currents such as will flow in the line when the source of direct-current power at the operating station is connected to the line conductors A and B.

In the operation of the system, when it is desired to give an indication on the meter M of the current flowing in the conductor at the remote station, the necessary code is transmitted over the line conductors A and B from the coding device at the control station to the remote station, causing the code responsive device at the remote station to energize the relay 10, which in turn, will close its own holding circuit to maintain its contact elements in the actuated position. The actuation of relay 10 will function to cause the relay 32 to connect the relay 20 in series with a line conductor B, disconnect the relay 24 from the line conductors A and B, and connect the rectifier 18 to the line conductors A and B. The actuation of relay 10 will also connect the current transformer 14 to the rectifier 18 and connect the calibrating rheostat 108 across the rectifier 18. Meanwhile, the code responsive device at the control station will energize the relay 146, which in turn, will energize the relay 133 to connect the meter M to the line conductors A and B, and to disconnect the relay 126 from the line conductors A and B. The rheostat 108 having been previously adjusted to the characteristics of the line conductors A and B and the meter M, the meter M will now indicate the current flowing in the conductor X at the remote station.

In order to disconnect the current metering circuits and return the system to normal, the controller 22 is actuated to break the holding circuit for the relays 146 and 148, thus deenergizing the relay 133, disconnecting the meter from the line conductors A and B and connecting the relay 126 to the line conductors A and B. The actuation of the controller 22 functions to connect the source of direct-current power at the control station to the line conductors A and B, which produces sufficient current in the line conductors A and B to operate the relay 20 at the remote station. The operation of the relay 20 will move the contact element 64 of the relay 20 to open circuit position to open the holding circuit of the relay 10. The relay 10 being thus deenergized, will disconnect the rheostat 108 and the winding of the current transformer 14 from the rectifier 18 and will deenergize the relay 32. With relay 32 deenergized, its contact elements 30 and 40 will close to reconnect the relay 24 to the line conductors A and B and its contact element 84 will open to interrupt the circuit of the relay 20. The return movement of the contact element 30 will interrupt the connection of the rectifier 18 with the line conductors A and B. The system will thus be returned to normal and will be prepared for any future operation of supervisory control apparatus or the remote metering apparatus for measuring current or potential on the conductors X and Y, or any other desired potential at the remote station.

If now it is desired to measure the potential between the conductors X and Y at the remote station, the coding device at the control station will be made to transmit the proper code impulses over the line conductors A and B, which will function to connect the meter M to the line conductors A and B at the operating station, and to connect the potential transformer 16 to the conductors X and Y and to the rectifiers 18, and to connect the rectifier 18 to the line conductors A and B. After the indication of the potential across the conductors X and Y at the remote station, on the meter M at the operating station, the system may be returned to normal by momentary actuation of the controller 22.

It is to be understood that the coding device at the control station, the line conductors A and B, and the code responsive devices at the control station and the remote station represent generally those parts of any suitable supervisory control system well known in the art for selecting and controlling the operation of apparatus at the remote station from the control station, and that the coding device may operate to select any or several other relays similar to relays 10 and 12 for the control of apparatus at the remote station. It is to be further understood that the system is not limited to the metering of current and potential on circuits at the remote station, but may be employed to indicate positions of apparatus or conditions at the remote station where these positions or conditions control potentials at the remote station, which may be transmitted over the line conductors A and B to the meter M at the control station.

It is also to be understood that the potentials existing at the remote station and to be indicated at the control station may be connected directly to the line conductors A and B so that either direct or alternating potentials may be transmitted without the use of the rectifier 18.

It will be seen that we have provided a remote metering system for use in conjunction with supervisory control systems which obviates the use of base current and hence obviates the disadvantages of systems using base current, which is simple and efficient in operation and which is inexpensive to manufacture and install, operate and maintain.

In compliance with the requirements of the patent statutes, we have shown and described herein the preferred embodiment of our invention. It is to be understood, however, that the invention is not limited to the precise construction shown and described, but is capable of modification by one skilled in the art, the embodi-

We claim as our invention:

1. In a remote metering system, in combination, electrical conductor means for transmitting a metering current from a remote station to a control station, metering current means for energizing said conductor means from the remote station with a current proportional to the quantity to be indicated at the control station, electro-responsive means connected to be energized by the current flowing in said conductor means, said electro-responsive means being operable only when energized by a current greater than the metering current, means responsive to the operation of said electro-responsive means for disconnecting said metering current means from the conductor means, and means for applying an operating current for said electro-responsive means to the conductor means.

2. In a system for indicating at a control station a condition at a remote station, in combination, an electrical circuit means connecting the two stations, means responsive to the condition at the remote station applying an indicating potential to said circuit means, electrically operable means at the control station responsive to the indicating potential, electro-responsive means at the remote station for removing said indicating potential from said circuit means, means connecting said electro-responsive means to be energized by the current in said circuit means, said electro-responsive means being operable only by current in the circuit of larger magnitude than the indicating current produced by said indicating potential, and means at the control station for producing current of such larger magnitude in said circuit means.

3. In a system for selectively indicating, at a first station, any of a plurality of conditions at a second station, in combination, an electrical circuit means connecting the two stations, means responsive to each of the conditions at the second station producing an indicating potential, control means operable from the first station for selectively connecting any of said indicating potentials to said circuit means, electrically operable means at the first station responsive to the indicating potential applied to said circuit means, electro-responsive means at the second station for removing the selected indicating potential from said circuit means, means connecting said electro-responsive means to be energized by the current in said circuit means, said electro-responsive means being operable only by current in the circuit of larger magnitude than the indicating current produced by said indicating potentials, and means at the first station for producing current of such larger magnitude in said circuit to thereby operate said electro-responsive means.

4. In a remote metering system for indicating at one station any of a plurality of alternating-current potentials at another station, in combination, an electrical circuit means extending between the stations, an electro-responsive device at the one station for indicating the potential applied to the said circuit means, a rectifier at the said other station, control means operable from the said one station for substantially simultaneously connecting said rectifier and said electro-responsive indicating means to said circuit means and selectively connecting any of said alternating-current potentials to said rectifier, relay means at the said other station connected in said electrical circuit and operable to disconnect said potentials from said rectifier and said rectifier from said circuit means when the value of the current in said circuit means is greater than that produced by the said potentials, and means at the one station for substantially simultaneously producing current in said circuit means sufficiently large to operate said relay means and disconnecting said electro-responsive indicating means from said circuit means.

5. In a system for operating a remote metering system in conjunction with a supervisory control system to indicate at the control station any of a plurality of electrical potentials existing at the controlled station, in combination, means whereby any desired one of the plurality of potentials may be selectively connected to the supervisory control circuit by the supervisory control equipment, a line relay operable to disconnect the selected potential from the supervisory control circuit, means whereby said line relay is automatically connected to be energized by the current in the supervisory control circuit when the desired one of the plurality of potentials is selected, said line relay being operable only by a larger current in the supervisory control circuit than the maximum current produced by any of the plurality of potentials, and means at the control station for producing such an operating current for said line relay in the supervisory control circuit when it is desired to disconnect the selected potential from the supervisory control circuit.

6. In a system for operating a remote metering system in conjunction with a supervisory control system to indicate at the control station an electrical potential existing at the controlled station, in combination, means whereby the said potential may be connected to the supervisory control circuit by the supervisory control equipment, a line relay operable to disconnect the said potential from the supervisory control circuit, means whereby said line relay is automatically connected to be energized by the current in the supervisory control circuit when the said potential is connected to the supervisory control circuit, said line relay being operable only by a larger current in the supervisory control circuit than the maximum current produced by the said potential, and means at the control station for producing such an operating current for said line relay in the supervisory control circuit when it is desired to disconnect the said potential from the supervisory control circuit.

7. In a system for operating a remote metering system in conjunction with a supervisory control system to indicate at the control station of the supervisory control system an electrical potential existing at the controlled station, in combination, an electro-responsive indicating means at the control station, means whereby the said potential and the said indicating means may be substantially simultaneously connected to the supervisory control circuit by the supervisory control equipment, a line relay at the controlled station operable to disconnect the said potential from the supervisory control circuit only when the current in the supervisory control circuit is larger than the current produced in the supervisory control circuit by the said potential, and means at the control station for substantially simultaneously producing such an operating current for said line relay and disconnecting said indicating means from the supervisory control circuit.

GENNERO DE CROCE.
WILLARD A. DERR.